March 17, 1964  J. D. MUNCH  3,125,206
CIGARETTE CARTON TRANSFER AND CONVEYING MACHINE
Filed Oct. 2, 1961  2 Sheets-Sheet 1
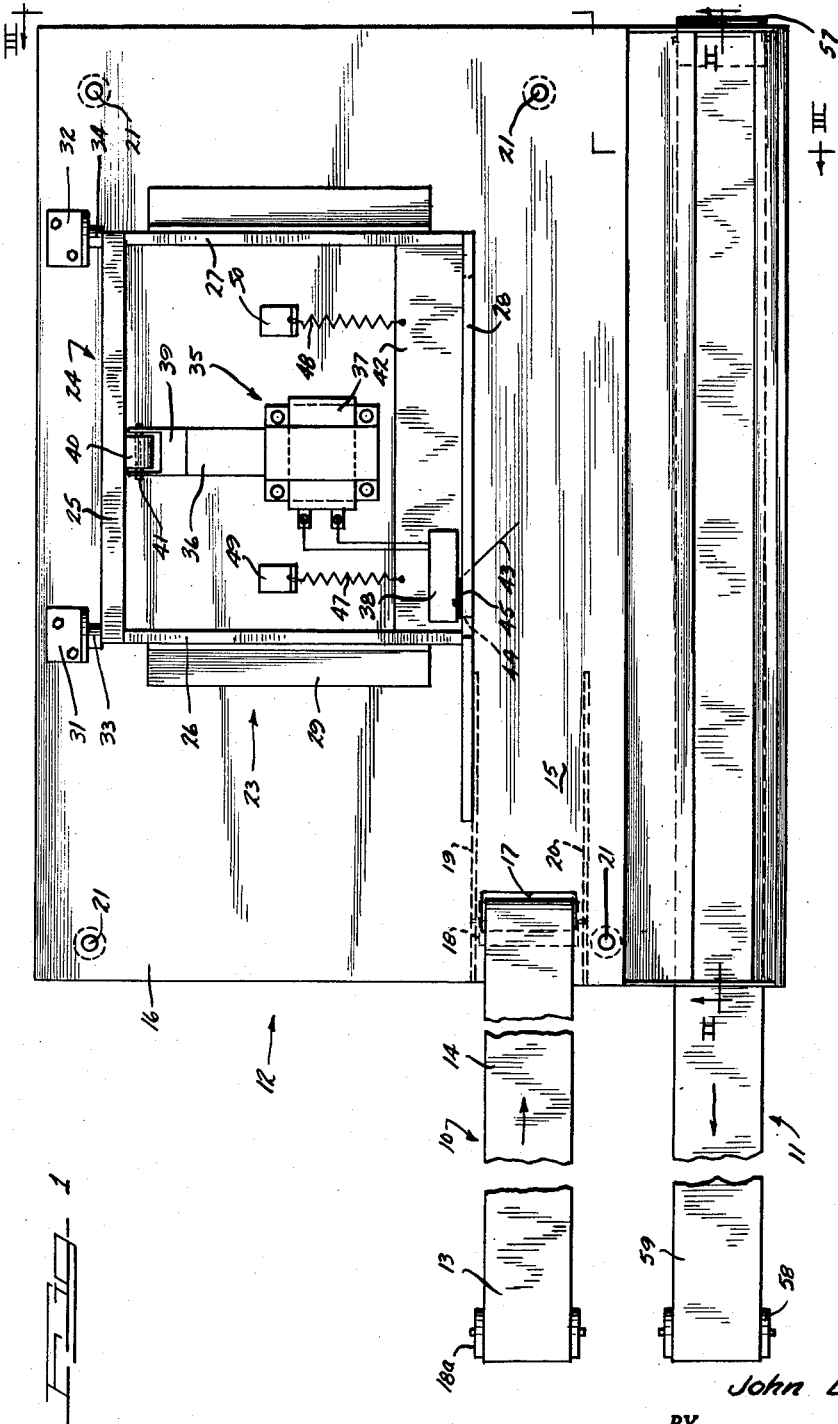
INVENTOR.
John D. Munch
BY
ATTORNEYS

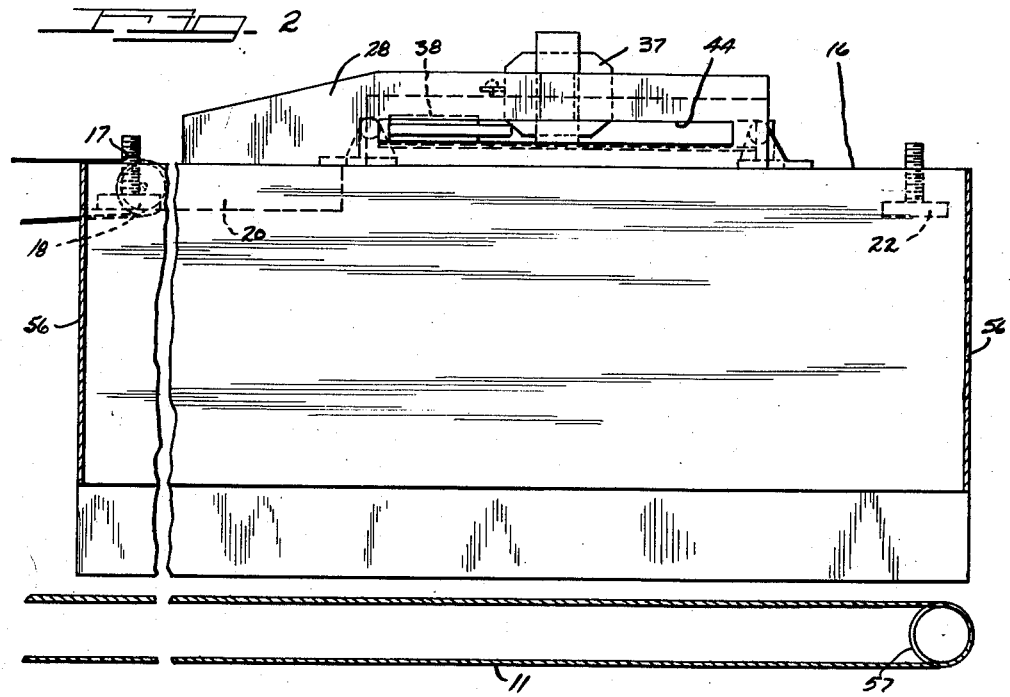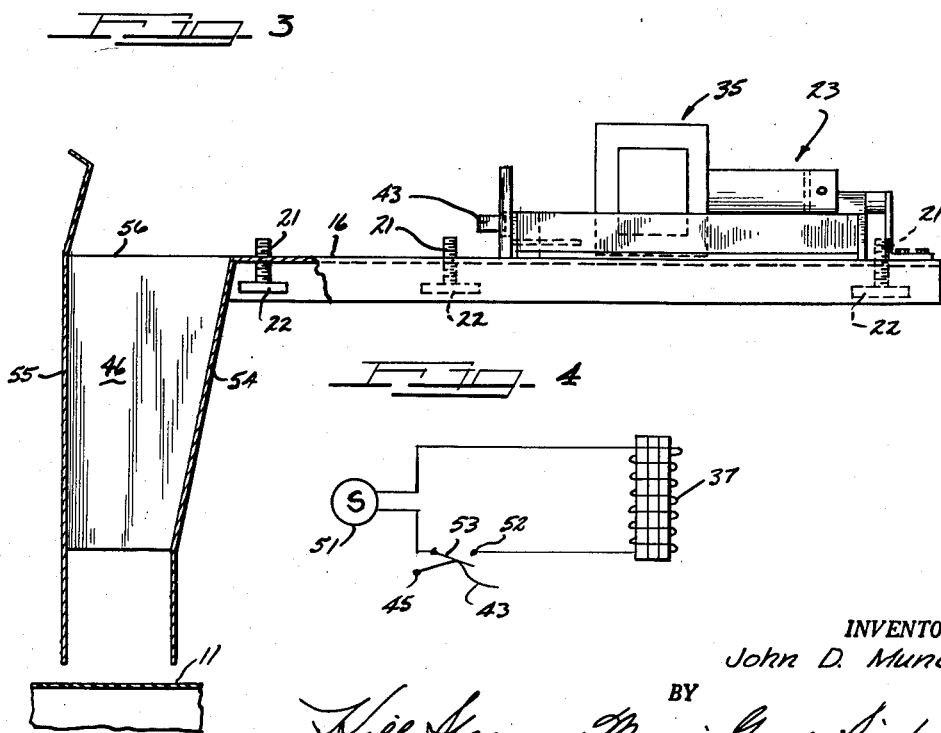

United States Patent Office 3,125,206
Patented Mar. 17, 1964

3,125,206
CIGARETTE CARTON TRANSFER AND
CONVEYING MACHINE
John D. Munch, 2351 Ogden Ave., Downers Grove, Ill.
Filed Oct. 2, 1961, Ser. No. 142,213
4 Claims. (Cl. 198—24)

This invention relates to transferring and conveying mechanisms and, more particularly, to a mechanism for receiving cartons from a loading station and automatically discharging them to a packing station located adjacent the loading station.

Products received by distributors and retailers from manufacturers are usually packed in boxes or cartons, and very frequently it is necessary for the distributor or retailer to perform an operation on the product and then reclose the carton which was opened for such operation. For example, cartons of cigarettes must be opened after they are received and a state tax stamp placed on the packages, and the cartons must then be reclosed prior to distribution to retail stores and vending machines.

While automatic mechanisms have been developed which open the cartons and place the stamps on the cigarette packages, this operation has required the efforts of at least two workmen, one to place the unprocessed cartons on a mechanism which delivers them to a processing station, and another to remove the cartons after they have passed through the processing station. It is apparent that a saving in expense and labor will be obtained if the number of workmen required to service such a process can be reduced to a single individual.

Accordingly, it is a primary object of this invention to provide a transfer and conveying mechanism which receives cartons after they have passed through a processing station and automatically returns them to a packing station located adjacent the loading station for the processing station.

It is another object of this invention to provide a mechanism for automatically transferring and conveying cigarette cartons after they have passed through a processing station.

It is still another object of this invention to provide apparatus that includes a loading station for a cartoned product, means for conveying the cartons past a processing station to a transfer and conveying mechanism which automatically transfers the cartons to another conveying mechanism and returns the cartons to a packing station located adjacent the loading station.

A further object of this invention is to provide an automatic transfer and conveying machine which includes switch means responsive to the presence of a carton and electrically energizable means responsive to the switch means for laterally transferring the cartons to a conveying mechanism.

This invention may be better understood and other objects, features and advantages more apparent from the following detailed description in conjunction with the accompanying figures of the drawings, wherein like reference numerals refer to like parts, in which:

FIGURE 1 is a view in top elevation of an automatic transfer and conveying mechanism constructed in accordance with the invention;

FIGURE 2 is a sectional view taken along the line II—II of FIGURE 1;

FIGURE 3 is a sectional view taken along the line III—III of FIGURE 1; and

FIGURE 4 is a schematic diagram of the electrical control system.

As shown on the drawings:

The apparatus illustrated in FIGURE 1 includes a supply conveyor belt 10, a discharge conveyor belt 11, and a mechanism 12 for automatically transferring material such as cartons from the supply conveyor belt to the discharge conveyor belt. The term "supply conveyor belt" is intended to include any suitable mechanism such as gripping rolls, conveyor chains or the like which convey the cartons from the stamping machine to the table or input track (hereinafter described and shown at 15).

The cartons to be processed are loaded onto the supply conveyor belt 10 at approximately the point indicated by the numeral 13 and this belt, which is driven by conventional means (not illustrated) coupled to a roller 18a in such a manner that the top side of the belt moves toward the right as indicated by the arrow, moves the cartons through a processing station which is located at approximately the point indicated by the numeral 14. The conveyor belt 10 then discharges the cartons onto an input track 15 formed on the mechanism 12.

The transferring conveying mechanism 12 includes a flat surface or table 16. The supply conveyor belt 13 passes over the table 16 adjacent the input track 15 and is looped through a slot 17, best shown in FIGURE 2, formed in the table. A roller 18 is rotatably mounted between two downwardly extending braces 19 and 20 fastened to the underside of the table 16. As can be seen in FIGURE 2, the belt 10 passes through the slot 17 and around the rollers 18 and 18a. It is apparent that when a continuous supply of cartons is placed on the belt 10, the cartons will be deposited on the input track 15 and each succeeding carton will force the preceding cartons along the input track toward the right as seen in FIGURE 1.

The table 16 is preferably mounted on a suitable stand (not shown) which has a substantially horizontal upper surface. Four adjustable supporting members 21 are screwed into threaded holes formed in the table 16 and have enlarged flat heads 22, FIGURES 2 and 3, which rest on the stand. It is apparent that the upper surface of the table 16 can be made exactly horizontal by adjusting the amount by which the supporting members 21 are screwed into the table 21.

Mounted on the table 16 is an automatic transfer mechanism 23. It includes a sliding carriage 24 formed by a back rail 25, two side rails 26 and 27 and a pusher bar 28. The side rails 26 and 27 slidably engage two guide rails 29 and 30, respectively, which are fastened to the top surface of the table 16. Also mounted on the table 16 are two angle irons 31 and 32 and two resilient cushions 33 and 34 which bear against the back rail 25 of the carriage 24.

A conventional solenoid mechanism 35 is fastened to the table 16 and has its movable ferromagnetic core or plunger 36 coupled to the back rail 25 and its coil 37 electrically connected to be energized by a switch 38. The plunger 36 is connected to the back rail 25 by a U-shaped member 39 which is coupled to a boss 40 formed on the rail 25 by a bolt 41. The switch 38 is mounted on a plate 42 which is attached to the pusher bar 28 and the two side rails 26 and 27, and has a switch arm 43 which extends through a slot 44 formed in the pusher bar 28. The construction of the switch 38 and the switch arm 43 is such that when a carton, moving toward the right as seen in FIGURE 1, causes the switch arm 43 to rotate in a counterclockwise direction around a pivot 45, switch contacts are closed and the coil 37 of the solenoid 35 is energized. Energization of this coil 37 causes the movable plunger 36 to be pulled into the coil, in accordance with well known electrical theory, and the back rail 25 and the carriage 24 are pulled laterally as seen in FIGURE 1. This action causes the carton that actuated the switch arm 43 and the switch 38 to be forced laterally as seen in FIGURE 1 by the pusher bar 28 into an open well 46. After the carton falls into the well 46 and pressure on the switch arm 43 is released, the switch 38 opens and the coil 37 is deenergized. Subsequently, two springs 47 and 48, which are attached between the plate 42 and two angle irons 49 and 50 mounted on the table 16, pull the sliding carriage 24 back to the rest position where the back rail 25 contacts the two cushions 33 and 34.

FIGURE 4 is a schematic diagram of the electrical connections between the coil 37 and the switch 38. The coil 37 is connected to a suitable source 51 of electric potential through a stationary electrical contact 52 and a movable contact 53. The switch arm 43, when forced in a counterclockwise direction around the pivot 45 by a carton, forces the movable contact 53 against the stationary contact 52 and causes the solenoid coil 37 to be energized.

The construction of the open well 46 is best illustrated in FIGURE 3. It includes a sloping side wall 54 and a substantially vertical side wall 55 and end walls 56 formed at each end of the well. The bottom of the well 46 opens above the top of the discharge conveyor belt 11. A portion of the end wall 56 on the side toward the discharge end is cut away to permit passage of the cartons.

The discharge conveyor belt 11 is mounted at one end by a roller 57, which is supported by conventional means, and at its other end by a roller 58, also supported by conventional means. This belt leads cartons past a packing station located at the point indicated by the numeral 59. In operation, a series of cartons, for example cigarette cartons, are loaded on the conveyor belt 10 at the point 13 and are carried past the processing station 14 and deposited on the input track 15 formed on the table 16. Successive cartons force each other along the input track 15 and against the switch arm 43. When a carton causes the switch arm 43 to pivot in a counterclockwise direction around the pivot 45, the switch 38 closes and energizes the coil 37 of the solenoid 35. The movable plunger 36 of the solenoid is then pulled into the coil 37 and the carriage including the pusher bar 28 is moved laterally as seen in FIGURE 1. The carton that causes actuation of the switch 38 is forced by the pusher bar 28 into the well 46 where it drops onto the discharge conveyor belt 11. The switch 38 will remain closed until the carton falls into the well. Since the top side of the discharge conveyor belt 11 is continuously moving toward the left as indicated by the arrow in FIGURE 1, these cartons are immediately removed to the packing station 59 located adjacent the loading station 13. Movement of the carton towards the open well 46, releases the switch arm 43 and the switch 38 opens, causing deenergization of the coil 37. The two springs 47 and 48 then pull the carriage 24 back against the two resilient cushions 33 and 34.

It is apparent that a novel and useful transfer and conveying mechanism has been invented. The apparatus is adapted to receive cartons after they have passed through a processing station and transfer them to a conveying means and a packing station located adjacent the loading station. The apparatus is capable of providing a substantial saving in labor and expense by eliminating the need for at least one individual, since in conventional systems one individual is required to load the cartons and another is needed to pack them after the processing operation. In accordance with this invention, one individual can perform both functions since the loading station and the packing station are located adjacent each other.

The construction could be modified by mounting the solenoid coil on the movable carriage 24 and coupling the plunger 36 to the table 16. Instead of the switch 38 and arm 43, an electric eye or other means responsive to the presence of a carton could be used to energize the coil 37.

It will be apparent that other modifications and variations may be effected without departing from the scope of the novel concepts of the present invention, and it will be understood that the application is to be limited only by the scope of the appended claims.

I claim as my invention:
1. A cigarette carton conveying and transfer apparatus having a receiving station and a discharge station adjacent to each other comprising:
   a first conveyor means traveling in one direction and one end thereof receiving cigarette cartons,
   a transfer table means connected to the other end of the first conveyor means to receive cigarette cartons from the first conveyor,
   a well delivery means connected to said transfer table,
   said well delivery means having two side walls and two end walls forming a cigarette carton delivery well,
   one of said side walls is connected to the transfer table so that the top thereof is flush with the surface of the table,
   said one side wall having a top portion diverging downwardly from the transfer table and a bottom portion extending perpendicular to the transfer table,
   the other side wall is spaced a predetermined distance from the one-side wall and extends perpendicular to the transfer table and above the surface thereof,
   said delivery well end walls connecting the side walls to form the cigarette carton delivery well,
   a second conveyor means positioned below said first conveyor means and traveling in the opposite direction,
   said second conveyor having a receiving end positioned below the delivery well and a discharge end positioned adjacent to the receiving end of the first conveyor,
   said delivery well side walls and one end wall having their bottoms spaced from the surface of the second conveyor less than the thickness of a cigarette carton,
   the other delivery well end wall being spaced from the surface of the second conveyor a distance greater than the thickness of the cigarette cartons to allow the carton to pass thereunder to the discharge station,
   a transfer means connected to the transfer table,
   said transfer means including
      a carriage slidably mounted between guide rails on the transfer table surface,
      a solenoid coupled to said carriage and to said transfer table, and
      electrical switch means mounted on said carriage and electrically connected to energize the solenoid,
      a pusher bar connected to said carriage,
   said transfer means being mounted on the transfer table so that cigarette cartons delivered from the first conveyor to the transfer table will contact the transfer electrical switch and energize the solenoid to move the transfer carriage and have the pusher bar contact the cigarette carton to push the cigarette carton from the table into the delivery well
   whereby the cigarette carton is delivered to the second conveyor and therefrom to the cigarette carton discharge station.

2. A cigarette carton conveying and transfer apparatus having a receiving station and a discharge station adjacent to each other comprising:
   a first conveyor means traveling in one direction and one end thereof receiving cigarette cartons,
   a transfer table means connected to the other end of the first conveyor means to receive cigarette cartons from the first conveyor,
   a well delivery means connected to said transfer table,
   said well delivery means having two side walls and two end walls forming a cigarette carton delivery well,
   one of said side walls is connected to the transfer table so that the top thereof is flush with the surface of the table,
   the other side wall is spaced a predetermined distance from the one-side wall, said delivery well end walls connecting the side walls to form the cigarette carton delivery well, a second conveyor means positioned below said first conveyor means and traveling in the opposite direction, said second conveyor having a receiving end positioned below the delivery well and a discharge end positioned adjacent to the receiving end of the first conveyor, a transfer means connected to the transfer table, said transfer means being mounted on the transfer table so that cigarette cartons delivered from the first conveyor to the transfer table will energize the transfer means to push the cigarette carton from the table into the delivery well whereby the cigarette carton is delivered to the second conveyor and therefrom to the cigarette carton discharge station.

3. A carton conveying and transfer apparatus having a receiving station and a discharge station adjacent to each other comprising:

a first conveyor means traveling in one direction and one end thereof receiving cartons, a transfer table means connected to the other end of the first conveyor means to receive cartons from the first conveyor, a well delivery means connected to said transfer table, said well delivery means having two side walls and two end walls forming a carton delivery well, one of said side walls is connected to the transfer table so that the top thereof is flush with the surface of the table, said one side wall having a top portion diverging downwardly from the transfer table and a bottom portion extending perpendicular to the transfer table, the other side wall is spaced a predetermined distance from the one-side wall and extends perpendicular to the transfer table and above the surface thereof, said delivery well end walls connecting the side walls to form the cigarette carton delivery well, a second conveyor means positioned below said first conveyor means and traveling in the opposite direction, said second conveyor having a receiving end positioned below the delivery well and a discharge end positioned adjacent to the receiving end of the first conveyor, said delivery well side walls and one end wall having their bottoms spaced from the surface of the second conveyor less than the thickness of a carton, the other delivery well end wall being spaced from the surface of the second conveyor a distance greater than the thickness of the carton to allow the carton to pass thereunder to the discharge station, a transfer means connected to the transfer table, said transfer means being mounted on the transfer table so that a carton delivered from the first conveyor to the transfer table will energize the transfer means to move the transfer means to push the carton from the table into the delivery well whereby the carton is delivered to the second conveyor and therefrom to the carton discharge station.

4. A carton conveying and transfer apparatus having a receiving station and a discharge station adjacent to each other comprising:

a first conveyor means traveling in one direction and one end thereof receiving cartons, a transfer table means connected to the other end of the first conveyor means to receive cartons from the first conveyor, a well delivery means connected to said transfer table, said well delivery means having two side walls and two end walls forming a carton delivery well, one of said side walls is connected to the transfer table so that the top thereof is flush with the surface of the table, the other side wall is spaced a predetermined distance from the one-side wall, said delivery well end walls connecting the side walls to form the carton delivery well, a second conveyor means positioned below said first conveyor means and traveling in the opposite direction, said second conveyor having a receiving end positioned below the delivery well and a discharge end positioned adjacent to the receiving end of the first conveyor, a transfer means connected to the transfer table, said transfer means being mounted on the transfer table so that a carton delivered from the first conveyor to the transfer table will energize the transfer means to push the carton from the table into the delivery well whereby the carton is delivered to the second conveyor and therefrom to the carton discharge station.

References Cited in the file of this patent

UNITED STATES PATENTS

| | | |
|---|---|---|
| 2,525,953 | Saxe | Oct. 17, 1950 |
| 2,890,553 | Day | June 16, 1959 |
| 2,942,717 | Raynor | June 28, 1960 |